United States Patent
Payne et al.

(10) Patent No.: US 7,803,725 B2
(45) Date of Patent: Sep. 28, 2010

(54) CARRIER MEMBRANE, COATED MEMBRANE COMPOSITE, AND METHOD

(75) Inventors: Stephen Richard Payne, Highlands Ranch, CO (US); Albert George Dietz, III, Littleton, CO (US)

(73) Assignee: Johns Mansville, Denver, CO (US)

( * ) Notice: Subject to any disclaimer, the term of this patent is extended or adjusted under 35 U.S.C. 154(b) by 789 days.

(21) Appl. No.: 11/656,771

(22) Filed: Jan. 23, 2007

(65) Prior Publication Data

US 2008/0176022 A1 Jul. 24, 2008

(51) Int. Cl.
*B32B 27/04* (2006.01)
*B32B 27/12* (2006.01)
*B32B 5/02* (2006.01)

(52) U.S. Cl. .......................... 442/86; 442/357; 442/381; 442/401; 442/402; 442/408; 428/91; 428/96; 427/207.1; 427/299; 427/372.2

(58) Field of Classification Search ................... 442/86, 442/357, 381, 401, 402, 408; 428/91, 96; 427/207.1, 299, 372.2
See application file for complete search history.

(56) References Cited

U.S. PATENT DOCUMENTS

2005/0282449 A1* 12/2005 Mehta et al. .................. 442/35
2006/0228962 A1* 10/2006 Souther et al. ................ 442/79

* cited by examiner

*Primary Examiner*—Norca L Torres-Velazquez
(74) *Attorney, Agent, or Firm*—Robert D Touslee

(57) ABSTRACT

A pliable reinforcement carrier membrane for use in a coated membrane composite includes a pliable non-woven fibrous mat of entangled polymeric fibers and a hydrophobic binder. The membrane is made so that a first surface of the mat has portions of a portion of the polymeric fibers of the mat protruding therefrom in extent and in sufficient amounts to give the first surface of the mat a fuzzy characteristic to facilitate adhesion of a coating material and a second surface of the fibrous mat has a generally smooth, non-fuzzy surface. A pliable waterproof composite, including the membrane, has a bottom surface formed by a filled asphalt, modified bitumen, or non-asphaltic polymeric coating that overlies and is adhered to the first surface of the mat to provide a barrier against liquid water transmission through the composite and a top surface formed by the second surface of the mat.

54 Claims, 5 Drawing Sheets

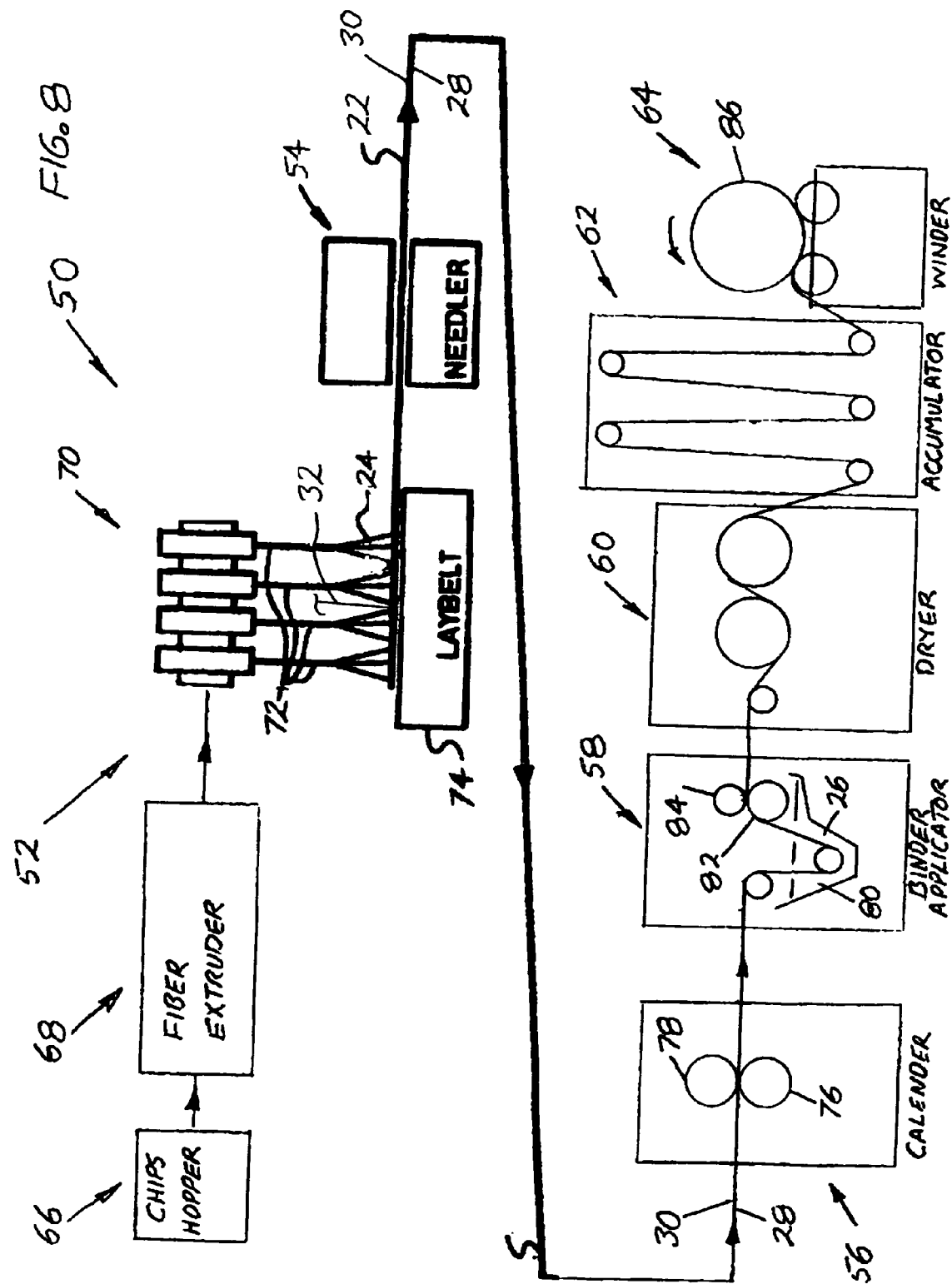

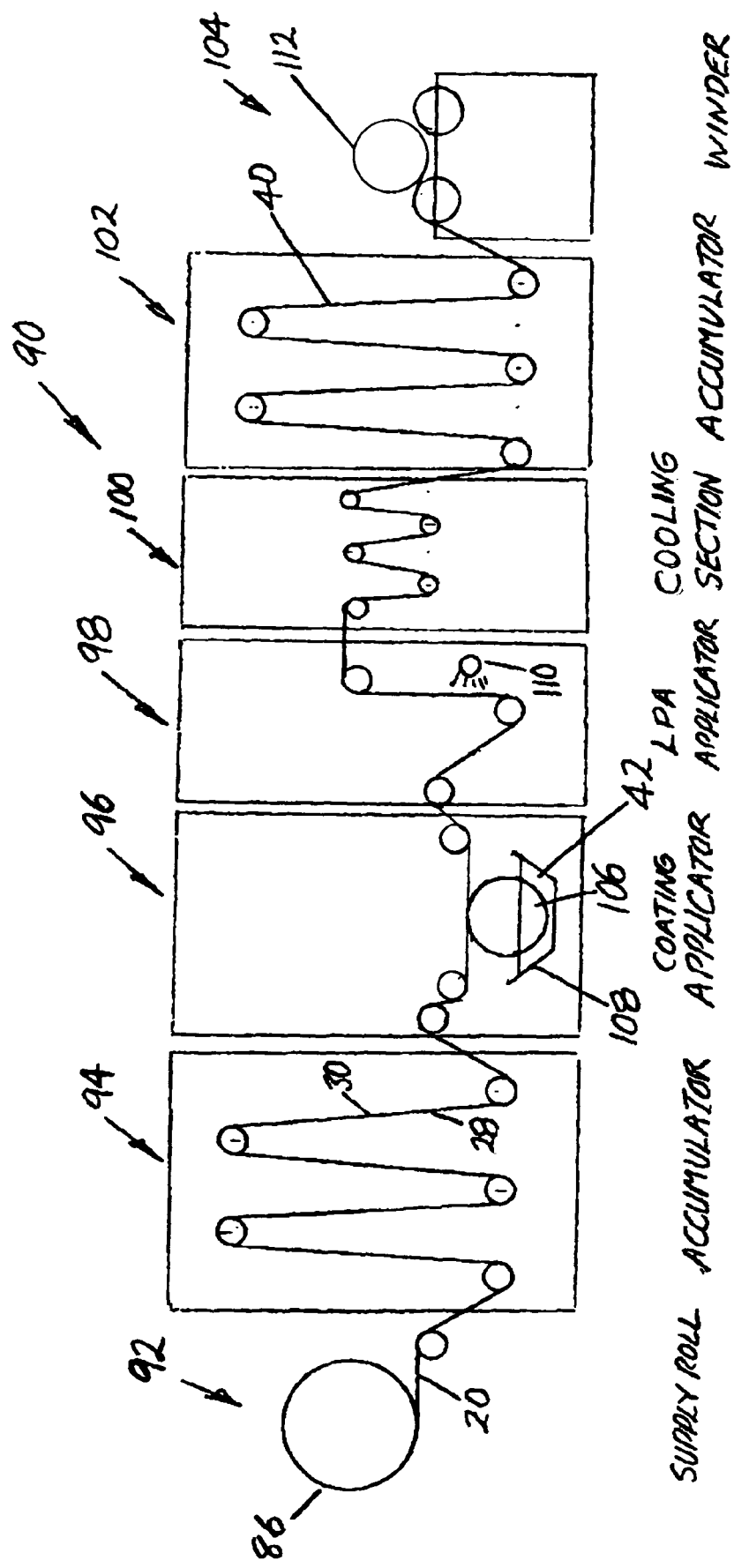

CARRIER MEMBRANE, COATED MEMBRANE COMPOSITE, AND METHOD

BACKGROUND OF THE INVENTION

The subject invention relates to a lightweight, pliable, reinforcement carrier membrane for use in coated composites, to coated composites utilizing the reinforcement carrier membrane, and to the method of making the reinforced carrier membrane and coated composites utilizing the reinforcement carrier membrane. For many applications, the coated composites of the subject invention utilizing the lightweight reinforcement carrier membrane of the subject invention are only coated on one major surface and are particularly well suited for use: in various building construction applications, such as but not limited to roofing underlayment applications, house-wrap applications, non-slip surface applications, etc. and as facers for fibrous insulation boards, foam insulation boards, fibrous sheathing boards, foam sheathing boards, etc.

While well suited for other applications, the coated composite of the subject invention is particularly well suited for use as a roofing underlayment. In typical residential roofing construction, a roofing underlayment is installed on the wooden roof deck prior to installing the asphalt shingle, shake shingle, tile, slate, or metal roofing system on the deck. The most common underlayments currently used in residential roofing construction are asphalt saturated organic felt underlayments that conform to ASTM Standard Designation D 4869-05 entitled "Standard Specification for Asphalt-Saturated Organic Felt Underlayment Used in Steep Slope Roofing", or ASTM Standard Designation D 226-05 "Standard Specification for Asphalt-Saturated Organic Felt Underlayment Used in Roofing and Waterproofing". The asphalt saturated organic felt underlayments typically used with standard performance roofing shingle products are the No. 15 underlayments and the asphalt saturated organic felt underlayments typically used with higher performance roofing shingle products are the heavier No. 30 underlayments.

A primary purpose of a roofing underlayment is to provide a water transmission-resistant layer (water shedding layer) over the wooden roof deck of a home or similar structure under construction, prior to the installation of the residential roofing system on the deck, to protect the structure from water damage due to inclement weather such as rain and snow. It is common roofing practice to build up redundant or multiple water shedding layers over the roof deck. With building construction schedules, including unanticipated delays in these schedules, the water transmission-resistant layer to be formed by these roofing underlayments can be in place on the wooden roof deck for many months prior to the installation of the roofing system and is thus intended to protect the wooden roof deck from water damage due to inclement weather during this period. Once a roofing system is installed, a secondary purpose of these roofing underlayments is to provide another layer of water transmission resistant protection below the shingles, should water enter the roofing system due to wind-driven rain, snow or ice buildup, or damaged or missing shingles.

With longer service life shingles coming into greater use, there has been and continues to be a need for roofing underlayments that have a longer service life and improved physical properties such as: a higher tear strength so that the underlayments can not be as easily torn during installation or while exposed on a roof deck during subsequent construction activity; a higher resistance to deterioration when left exposed to the weather for more than a few days; a greater resistance to fastener pull through so that the underlayments are not blown away or torn during exposure to inclement weather conditions; a greater resistance to deterioration when installed under a shingle layer in a roofing system; and a greater resistance to fungi growth while in service.

SUMMARY OF THE INVENTION

The lightweight, pliable, reinforcement carrier membrane of the subject invention and the coated composites of the subject invention utilizing the lightweight reinforcement carrier membrane of the subject invention, such as but not limited to the preferred building construction underlayment composites and other coated composites of the subject invention, provide a solution to the problems associated with the use of asphalt saturated organic felt roofing underlayments and other mat reinforced composites utilized in the construction and other industries. With regard to the construction industry, the coated composites of the subject invention (e.g. roofing underlayment composites, house wrap composites, insulation blanket or board facing composites, and various non-slip surface composites) utilizing the reinforcement carrier membrane of the subject invention: are resistant to liquid water transmission; have a high tear strength; have a high resistance to fastener pull through; are not easily torn during installation or while exposed on a roof deck or other construction surface during subsequent construction activity; can be left exposed to climatic conditions on a roof deck or other construction surface for extended periods of time without any appreciable deterioration including degradation due to exposure to ultraviolet radiation (hereinafter "UV radiation"); do not appreciably deteriorate beneath a layer of shingles over the service life of a roofing system; are fungi resistant over the anticipated service life of the underlayments as substrates of a roofing system; and are economical to produce. When asphalt coated roofing underlayment composites of the subject invention are compared to conventional asphalt saturated organic felt roofing underlayments, the asphalt coated roofing underlayment composites of the subject invention are light in weight and can be packaged, stored, shipped, and handled in roll sizes of greater widths and/or lengths than those used for conventional asphalt saturated organic felt roofing underlayments. With improved tear and fastener pull through resistance and in some embodiments a self-adhering bottom major surface, fewer fasteners can be used to secure the asphalt coated roofing underlayment composites of the subject invention to a roof deck thereby saving material, labor, and other associated installation costs.

The lightweight reinforcement carrier membrane of the subject invention includes a pliable, non-woven fibrous mat of entangled polymeric fibers, a hydrophobic binder that bonds the polymeric fibers of the fibrous mat together, and may include an additional reinforcement such as but not limited to a scrim. The fibrous mat is formed and processed so that the fibrous mat and the reinforcement carrier membrane produced with the fibrous mat have a first major surface with a portion of the mat's polymeric fibers protruding therefrom in extent and in sufficient amounts to give the first major surface of the fibrous mat and reinforcement carrier membrane a fuzzy characteristic and a second major surface that is a non-fuzzy, smooth or generally smooth surface. The fuzzy characteristic of the first major surface of the fibrous mat and reinforcement carrier membrane facilitates the adhesion of a coating material to the first major surface of the fibrous mat and reinforcement carrier membrane, when forming a coated, reinforcement carrier membrane composite. The hydrophobic binder is present throughout the fibrous mat and most significantly on the second major surface of the fibrous mat and reinforcement carrier membrane. For selected applications, hydrophobic binder has an innate tackiness and is present on the second major surface of the fibrous mat and reinforcement carrier membrane in an amount sufficient to increase the surface friction of the second major surface of the fibrous mat and reinforcement carrier membrane. Preferably, the polymeric fibers of the fibrous mat are: substantially uniformly dispersed throughout the fibrous mat; generally continuous spunbond polymeric fibers; and have been further entangled after the fibrous mat was initially formed (e.g. by needling or other mechanical means) to provide the fibrous mat with greater structural integrity and resistance to delamination in processing and service.

A lightweight pliable waterproof composite of the subject invention includes the reinforcement carrier membrane of the subject invention and a filled asphalt, modified bitumen, or non-asphaltic polymeric coating overlying, substantially coextensive with, and adhered to the first major surface of the fibrous mat and reinforcement carrier membrane. The overlying coating on the first major surface of the fibrous mat and reinforcement carrier membrane provides a barrier against liquid water transmission through the pliable waterproof composite and forms a bottom major surface of the pliable waterproof composite. In a preferred embodiment, the second major surface of the fibrous mat and reinforcement carrier membrane, with its innately tacky hydrophobic binder, forms the top major surface of the pliable waterproof composite to provide the pliable waterproof composite with a slip-resistant top surface. The pliable nature of the lightweight pliable waterproof composite of the subject invention enables the waterproof composite of the subject invention to be wound into a roll good for ease of storage, shipment, handling, and installation.

BRIEF DESCRIPTION OF THE DRAWINGS

FIG. 8 is a schematic side view of a production line for making the lightweight, pliable reinforcement carrier membrane of the subject invention.

FIG. 9 is a schematic side view of a production line for making the lightweight, pliable waterproof composite of the subject invention

DETAILED DESCRIPTION OF THE INVENTION

Figure 1:
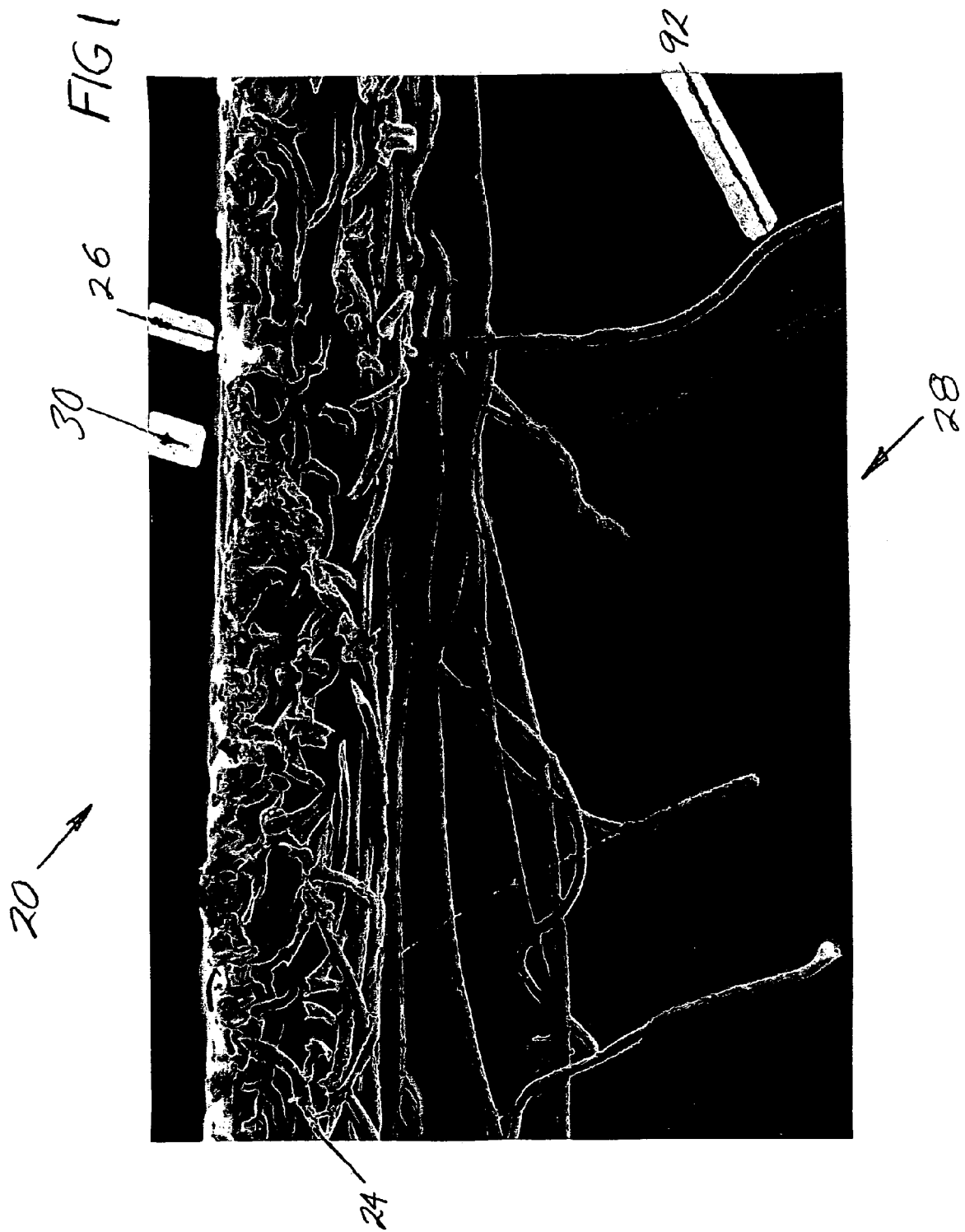
FIG. 1 is an illustration (at a magnification of 50×) through the thickness of a portion of a lightweight, pliable reinforcement carrier membrane of the subject invention.
Figure 2:
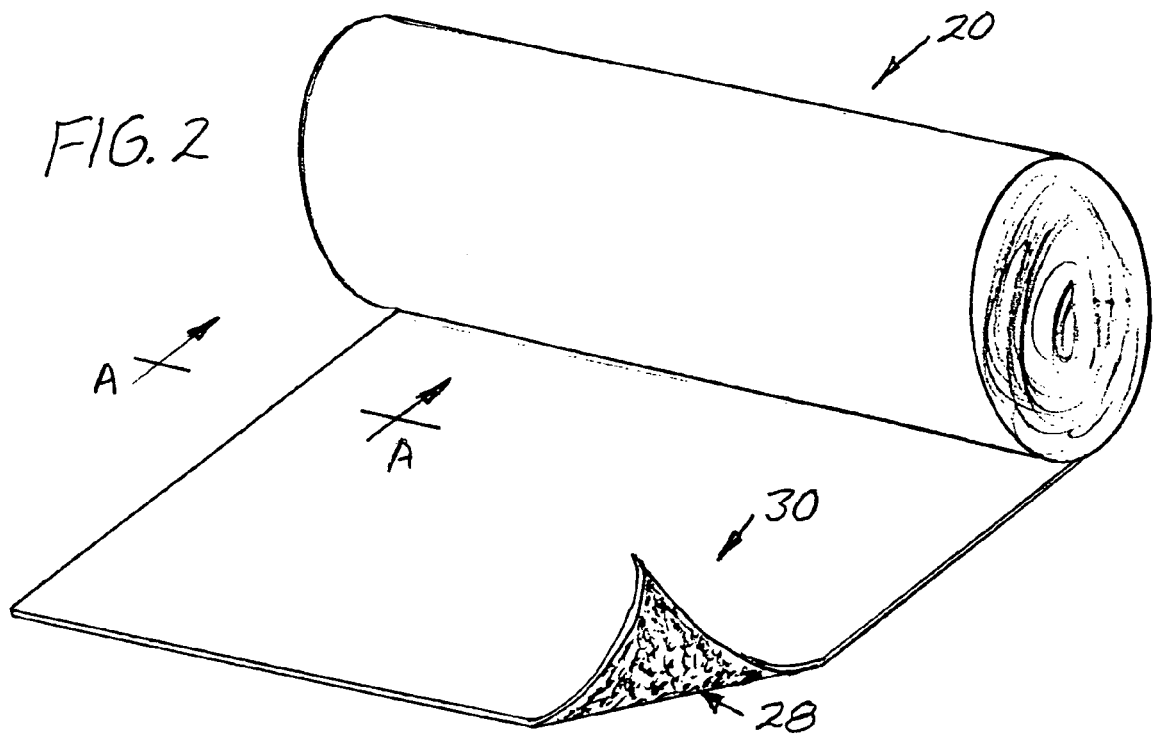
FIG. 2 is a schematic perspective view of a lightweight, pliable reinforcement carrier membrane of the subject invention in the form of a roll good.
Figure 3:
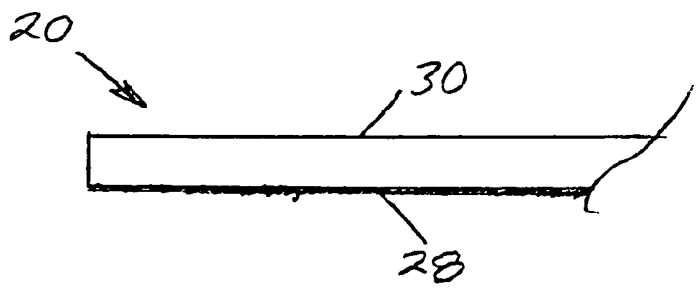
FIG. 3 is a schematic transverse cross section through a first embodiment of the lightweight, pliable reinforcement carrier membrane of FIG. 2, taken substantially along lines A-A of FIG. 2 and on a larger scale than the scale of FIG. 2.

FIGS. 1 to 4 pictorially and schematically illustrate preferred embodiments of the lightweight, pliable, reinforcement carrier membrane 20 of the subject invention. With reference to FIGS. 1 to 3, the reinforcement carrier membrane 20 includes a pliable, non-woven fibrous mat 22 of entangled polymeric fibers 24 and a hydrophobic binder 26 that is dispersed throughout the non-woven fibrous mat and bonds the entangled polymeric fibers 24 together. Preferably, the polymeric fibers 24 of the non-woven fibrous mat 22 are uniformly dispersed or substantially uniformly dispersed throughout the non-woven fibrous mat. The reinforcement carrier membrane typically has a thickness between about 0.25 millimeters and about 0.40 millimeters. The reinforcement carrier membrane 20 has a weight between about 60 and about 180 grams per square meter (180 g/m$^2$) and typically a weight between about 90 and about 120 grams per square meter (90 to 120 g/m$^2$). Preferably, the reinforcement carrier membrane 20 is between about 59% by weight and about 90% by weight the polymeric material(s) of the polymeric fibers 24 of the non-woven fibrous mat 22 and between about 10% by weight and about 41% by weight hydrophobic binder 26 and more preferably, the reinforcement carrier membrane 20 is between about 70% by weight and about 87% by weight the polymeric material(s) of the polymeric fibers 24 of the non-woven fibrous mat 22 and between about 13% by weight and about 30% by weight hydrophobic binder 26.

The non-woven fibrous mat 22 and reinforcement carrier membrane 20 have first and second major surfaces 28 and 30 that are each defined by the length and the width of the non-woven fibrous mat. The first major surface 28 of the non-woven fibrous mat 22 and reinforcement carrier membrane 20 has portions 29 of a portion of the entangled polymeric fibers 24 of the non-woven fibrous mat protruding therefrom in extent and in sufficient amounts to give the first major surface 28 of the non-woven fibrous mat and reinforcement carrier membrane 20 a fuzzy characteristic. The fuzzy characteristic of the first major surface 28 facilitates a strong adhesion of a coating material to the first major surface of the non-woven fibrous mat 22 and reinforcement carrier membrane 20. The second major surface 30 of the non-woven fibrous mat 22 and reinforcement carrier membrane 20 is a non-fuzzy, smooth or generally smooth surface. The hydrophobic binder 26 is most notably present on the second major surface of the fibrous mat 22 and reinforcement carrier membrane 20. In addition to bonding together the polymeric fibers 24, the hydrophobic binder 26 closes and/or at least partially closes interstices of the non-woven fibrous mat 22 to thereby increase the liquid water transmission resistance of the reinforcement carrier membrane 20. Preferably, the polymeric fibers 24 of the non-woven fibrous mat 22 have been further entangled (e.g. by needle punching or other mechanical means) after the non-woven fibrous mat was initially formed to provide the non-woven fibrous mat 22 with a greater resistance to delamination during the processing of the non-woven fibrous mat and service.

For selected applications, the hydrophobic binder 26 utilized has an innate tackiness and is present on the second major surface of the fibrous mat 22 of the reinforcement carrier membrane 20 in an amount sufficient to increase the surface friction of the second major surface of the non-woven fibrous mat and reinforcement carrier membrane. For example, when used as a reinforcement carrier membrane of a roofing underlayment, preferably, the hydrophobic binder 26: is markedly present on the second major surface 30 of the non-woven fibrous mat 22 of the reinforcement carrier membrane 20, is resistant to UV radiation degradation, retains an innate tackiness, and is present on the second major surface 30 of non-woven fibrous mat 22 of the reinforcement carrier membrane 20 in an amount sufficient to increase surface friction of the second major surface of the non-woven fibrous mat 22 and reinforcement carrier membrane 20 to make the second major surface of the non-woven fibrous mat 22 and reinforcement carrier membrane 20 a slip resistant surface in both dry and wet conditions. Thus, the reinforcement carrier membrane 20 can be provided with a slip resistant surface without the need to apply gritty coating materials (e.g. sand, coal slag, rubber or plastic particles such as pulverized recycled tire scrap, or mixtures of these gritty materials) to the surface and/or the need to texture the surface (e.g. with an embossed pattern or discontinuous topical coating) during the manufacture of the reinforcement carrier membrane. The elimination of the need to apply gritty coating materials to and/or to texture the second major surface 30 of the non-woven fibrous mat 22 of the reinforcement carrier membrane 20 to make the surface slip resistant reduces product weight, increases the cleanliness of the manufacturing operation and/or otherwise reduces production costs, and improves the ease of the handling of the final product.

Preferably, the pliable, non-woven fibrous mat 22 (other than the possible inclusion in the non-woven fibrous mat of additional reinforcement such as shown and described in connection with FIG. 4) is made solely of generally continuous spunbond polymeric fibers. While the polymeric fibers 24 of the non-woven fibrous mat 22 may be made of other polymeric materials suitable for the application, preferably, the polymeric fibers 24 are made of polyester and/or polypropylene.

Although not preferred, it is contemplated that the non-woven fibrous mat 22 could be made of discontinuous polymeric filaments or staple fibers provided: the base weight of the reinforcement carrier membrane, compared to a reinforcement carrier membrane 20 having a fibrous mat made solely of generally continuous spunbond polymeric fibers, was increased by about 20% or more and provisions were taken to ensure the non-woven fibrous mat and reinforcement carrier membrane made therefrom had the required integrity, pliability, surface characteristics, and water transmission resistance. Although not preferred, it is also contemplated that continuous and discontinuous filaments or staple fibers made of polymer(s) or other materials, e.g. glass, could be included in a non-woven fibrous mat 22 of the reinforcement carrier membrane 20 provided the non-woven fibrous mat is made predominately of generally continuous spunbond polymeric fibers and provisions were taken to ensure the non-woven fibrous mat and reinforcement carrier membrane had the required integrity, pliability, surface characteristics, and water transmission resistance.

While the non-woven fibrous mat 22 of the reinforcement carrier membrane 20 can be made of generally continuous sheathed spunbond polymeric fibers, preferably, the non-woven fibrous mat 22 of the reinforcement carrier membrane 20 is made of less costly, generally continuous standard spunbond polymeric fibers. Standard polymeric fibers (homopolymer fibers) are made of one polymeric material and sheathed polymeric fibers (co-polymer fibers) have inner fiber cores made of a first polymeric material and outer fiber sheaths made of a second polymeric material that for this application would probably have a softening point temperature less than the softening point temperature of the fiber cores for thermal bonding. While it is preferred to bond together the polymeric fibers 24 of the non-woven fibrous mat 22 of the reinforcement carrier membrane 20 solely with the hydrophobic binder 26, it is contemplated that, through the application of heat and pressure to the non-woven fibrous mat 22 during the manufacturing process, polymeric material of the polymeric fibers 24 could be used in conjunction with the hydrophobic binder 26 to bond a portion of the polymeric fibers 24 together at their points of intersection and to fill interstices of the non-woven fibrous mat provided the process retained the required fuzzy and smooth surface characteristics of the non-woven fibrous mat described above.

Typically, the hydrophobic binder 26 is made of a hydrophobic acrylic binder material with or without filler(s) and with or without water repellant additive(s). Examples of hydrophobic binder materials that may be used as the hydrophobic binder 26 of the reinforcement carrier membrane 20 are:

1) vinyl acrylic binders with or without filler(s) and water repellant additive(s) such as a binder marketed by OmNova under the trade designation "Sequabond 145";
2) acrylic binders with or without filler(s) and water repellant additive(s) such as a binder marketed by OmNova under the trade designation "Acrygen® 60110" and/or "Omnapel® 60110"; and
3) styrenated acrylic binders with or without filler(s) and water repellant additive(s) such as a binder marketed by ParaChem under the trade designation "RD-F22".

Figure 4:
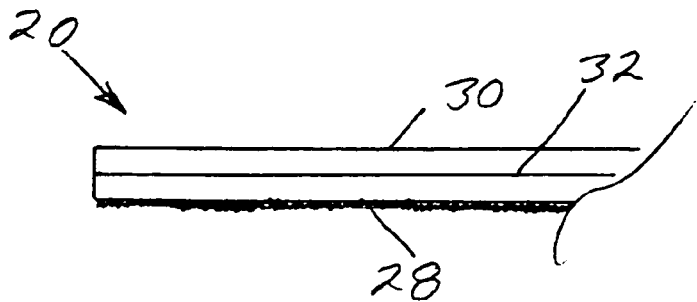
FIG. 4 is a schematic transverse cross section through a second embodiment of the lightweight reinforcement carrier membrane of FIG. 2, taken substantially along lines A-A of FIG. 2 and on a larger scale than the scale of FIG. 2, wherein the reinforcement carrier membrane includes additional reinforcement.

As schematically shown in FIG. 4, additional reinforcement 32, such as but not limited to scrim, generally continuous multifilament glass yarns, or other reinforcement, may be included in the non-woven fibrous mat 22 of the reinforcement carrier membrane 20. Preferably, the reinforcement 32 is contained within the non-woven fibrous mat 22 rather than being applied to a top or bottom major surface of the non-woven fibrous mat 22 and is typically introduced into the non-woven fibrous mat 22 as the non-woven fibrous mat 22 is being initially formed and prior to any subsequent further entanglement of the polymeric fibers 24 of the non-woven fibrous mat (e.g. by needle punching). When a scrim is utilized as the reinforcement 32, preferably, the scrim is a fiberglass scrim having a weight between about 5 grams per square meter (5 g/m$^2$) and about 15 grams per square meter (15 g/m$^2$). Other than the inclusion of the reinforcement 32 within the non-woven fibrous mat 22, the reinforcement carrier membrane 20 of FIG. 4 is the same as the reinforcement carrier membrane of FIG. 3.

The pliable reinforcement carrier membrane 20 of FIGS. 1 to 4 may be made in various widths (typically between about 3 feet and about 5 feet in width) and in various lengths (typically between about 300 and about 1000 feet in length). The reinforcement carrier membrane 20 water vapor permeable, and preferably, is substantially liquid water impermeable and water vapor permeable. Preferably, the reinforcement carrier membrane 20 has a water vapor transmission rate of 1 perm or greater as measured in accordance with ASTM E 96-05 (dry cup method).

Preferably, the reinforcement carrier membrane 20, when made of standard generally continuous spunbond polyester fibers, exhibits the following physical properties within a tolerance of ±20%: a tear resistance in pounds machine direction/cross machine direction—trap 16/12—tongue 5/7; a puncture resistance in pounds—20; a weight in pounds per square—2.1; a weight in pounds per ten squares—21.5; and a thickness in millimeters between 0.25 and 0.40.

The color of the top major surface of the reinforcement carrier membrane 20 may range from a white color to darker colors if desired by using colored fibers (e.g. fibers that are colored by introducing carbon black or other pigments into the polymer of the fibers to provide the non-woven fibrous mat 22 with a desired color) or by including carbon black or other pigments in the hydrophobic binder 26.

While not required for many applications, a water repellant coating or film material can be applied directly to the first and/or second major surfaces 28 and 30 of the reinforcement carrier membrane 20 to further increase the water transmission resistance of the reinforcement carrier membrane. For the type of water repellant coating materials set forth below, preferably, the reinforcement carrier membrane 20 is between about 59% by weight and about 89% by weight the polymeric material(s) of the polymeric fibers, between about 10% and about 35% by weight hydrophobic binder material, and between about 1% by weight and about 6% by weight the water repellant coating material. Examples of water repellant coating materials that may be used to form the water repellant coating material of the reinforcement carrier membrane 20 are materials such as but not limited to:

1) fluorocarbons with or without filler(s) such as fluorocarbon materials marketed by Apex under the trade designation "247/186 (FC)" or OmNova under the trade designation "X-Cape GFC";
2) silicone urethane fluorocarbons with or without filler(s) such as silicone urethane fluorocarbon materials marketed by Wacker under the trade designation "Exp 2830";
3) acrylic terpolymers with or without filler(s) such as acrylic terpolymer materials marketed by OmNova under the trade designation "Acrygen® 60110" and/or "Omnapel® 60110"; and
4) silicones such as silicone materials marketed by Dow Corning under the trade designation "IE 1260 and 753F.

Figure 5:
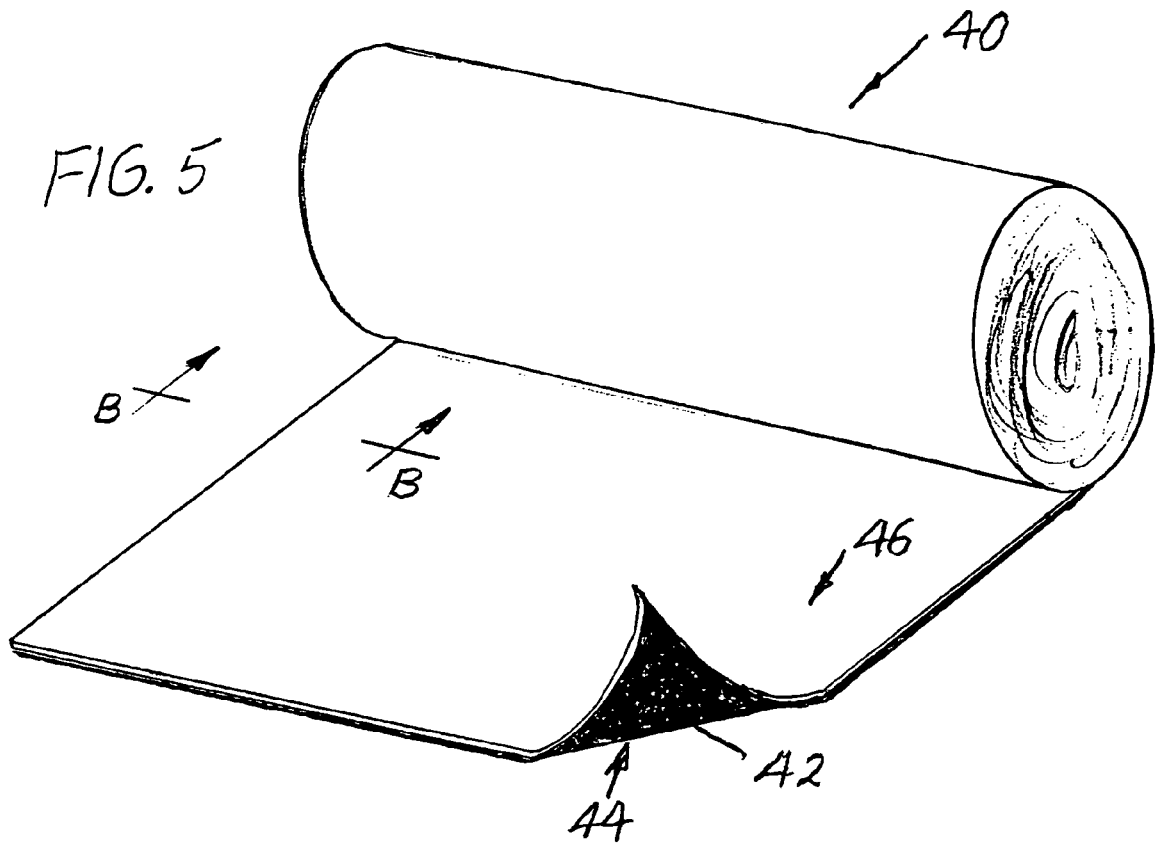
FIG. 5 is a schematic perspective view of a lightweight, pliable waterproof composite of the subject invention in the form of a roll good.
Figure 6:
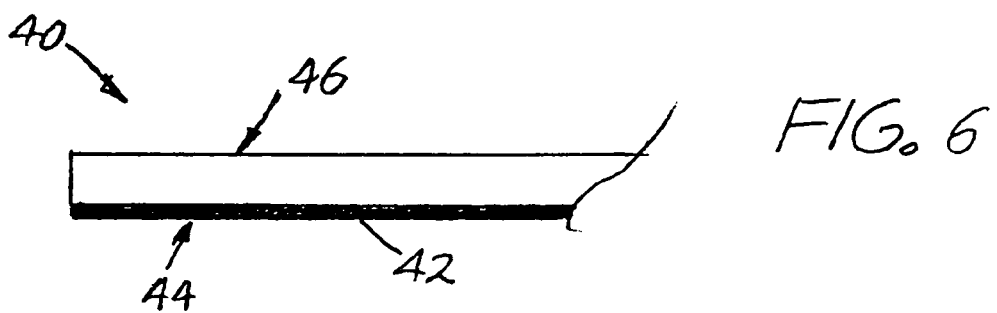
FIG. 6 is a schematic transverse cross section through a first embodiment of the lightweight, pliable waterproof composite of FIG. 5 taken substantially along lines B-B of FIG. 5 and on a larger scale than the scale of FIG. 5.
Figure 7:
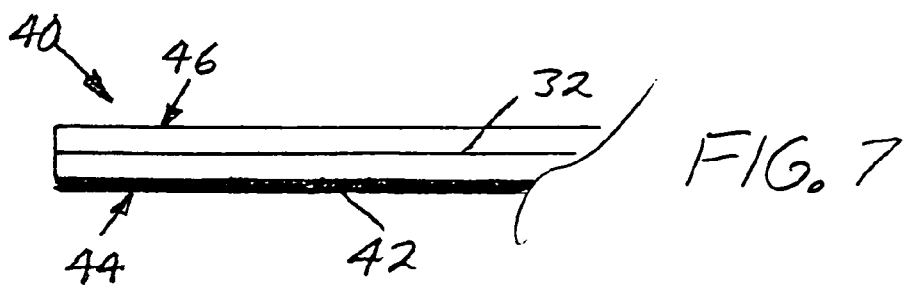
FIG. 7 is a schematic transverse cross section through a second embodiment of the lightweight, pliable waterproof composite of FIG. 5, taken substantially along lines B-B of FIG. 5 and on a larger scale than the scale of FIG. 5, wherein the lightweight pliable reinforcement carrier membrane of the waterproof composite includes an additional reinforcement.

FIGS. 5 to 7 schematically illustrate preferred embodiments of the lightweight, pliable waterproof composite 40 of the subject invention which contains a lightweight, pliable, reinforcement carrier membrane 20 and is typically a prefabricated building construction roofing underlayment, house wrap, facer, or other waterproof composite of the construction or other industries. The pliable waterproof composite 40, shown as a roll good, includes the pliable reinforcement carrier membrane 20 of FIG. 3 (with or without the water repellant coating) or the pliable reinforcement carrier membrane 20 of FIG. 4 with its additional reinforcement 32 (with or without the water repellant coating) and a filled asphalt, modified bitumen, or non-asphaltic polymeric coating 42 overlying, substantially coextensive with, and adhered to the first major surface 28 of the reinforcement carrier membrane 20. The coating layer 42 provides a barrier against liquid water transmission through and forms a bottom major surface 44 of the pliable waterproof composite 40. The second major surface 30 of the reinforcement carrier membrane 20 forms a top major surface 46 of the pliable waterproof composite 40. The hydrophobic binder 26 of the reinforcement carrier membrane 20 on the top major surface 46 of the pliable waterproof composite 40 can have an innate tackiness and be present on the top major surface 46 of the pliable waterproof composite 40 in an amount sufficient to increase surface friction of the top major surface of the pliable waterproof composite and make the top major surface 46 of the pliable waterproof composite a slip resistant surface in both dry and wet conditions.

Asphaltic materials are generally not very resistant to UV radiation degradation and, even when asphaltic materials contain additives for UV stabilization, asphaltic materials still degrade somewhat when exposed to UV radiation over lengthy periods of time. Thus, asphalt coated roofing underlayments and other similar roll goods, which, in service, can have their asphaltic material surfaces exposed to UV radiation over a lengthy period of time, can undergo a degradation of their tensile and breaking strength properties as well as other physical properties. The presence of a UV radiation degradation resistant hydrophobic binder 26, such as but not limited to an acrylic or styrenated acrylic hydrophobic binder, on the exposed top major surface 46 of the pliable waterproof composite 40 provides the pliable waterproof composite 40 with an improved resistance to UV radiation degradation. In service, the degradation resistant hydrophobic binder 26 and polymeric fibers 24 of the pliable waterproof composite 40 absorb a major portion of the UV radiation whereby the exposure of underlying asphaltic material and base polymeric fiber structure of the pliable waterproof composite 40 to UV radiation is materially reduced. This material reduction in exposure of the underlying asphaltic materials and polymeric substrate of the pliable waterproof composite 40 to UV radiation enables the pliable waterproof composite 40, when utilized as an roofing underlayment or other composite that is exposed to UV radiation, to better retain its tensile strength, breaking strength, and other physical properties in service over time.

The lightweight pliable waterproof composite 40, as a prefabricated building construction roofing underlayment, house wrap, facer, or other waterproof composite of the construction or other industries may be made in various widths (typically between about 3 feet and about 5 feet in width) and in various lengths (typically between about 300 and about 1000 feet in length). Preferably, the pliable waterproof composite 40 is substantially liquid water impermeable (passes ASTM test designation D 4869-05 for liquid water transmission). Preferably, the pliable waterproof composite 40 has a water vapor transmission rate of 0.05 perms or greater as measured in accordance with ASTM E 96-05 (dry cup method).

The lightweight, pliable waterproof composite 40, as a prefabricated building construction roofing underlayment or similar product, with a filled asphalt or modified bitumen coating 42 has a thickness between about 0.45 millimeters and about 0.90 millimeters (reinforcement carrier membrane 20 between about 0.25 millimeters and about 0.35 millimeters and the asphalt coating between about 0.20 millimeters and about 0.50 millimeters) and a weight between about 7 pounds and 20 pounds per 100 square feet and preferably a weight of about 15 pounds or less per 100 square feet and more preferably a weight of about 12 pounds or less per 100 square feet.

An example of a filled asphalt composition that can be used for the pliable waterproof composite 40 is about:
  64.6% by weight asphalt
  35% by weight Filler (Calcium Carbonate/Limestone)
  0.0 to 0.5% by weight Anti Oxidant/UV Stabilizer
  0.0 to 0.1% by weight Biocide An example of a modified bitumen composition that can be used for the pliable waterproof composite 40 is about:
  64.6% by weight asphalt
  25% by weight Filler (Calcium Carbonate/Limestone)
  8.0 to 15% by weight SBS polymer
  0.0 to 0.5% by weight Anti Oxidant/UV Stabilizer
  0.0 to 0.1% by weight Biocide Another example of a modified bitumen composition that can be used for the pliable waterproof composite 40 is about:

52% by weight Asphalt
40.8% by weight Filler (Calcium Carbonate/Limestone)
3.6% by weight Paraffin Wax
3.6% by weight Stearic Acid
0.5% by weight Anti Oxidant/UV Stabilizer
0.0 to 0.1% by weight Biocide Pliable asphalt coated waterproof composites 40 made with these asphaltic or modified bitumen compositions have: a Trap Tear Strength-MD of about 22.0 lbf (98.0 N); have a Trap Tear Strength-CD of about 16.6 lbf (74.0 N); have a Tensile Strength-MD of about 45.1 lbf/in (7.9 kN/m); have a Tensile Strength-CD of about 31.1 lbf/in (5.4 kN/m); have an Elongation to Breakage of about 50.0%; and a Water Vapor Transmission of about 0.10 Perms as measured in accordance with ASTM E 96-05 (dry cup method) entitled "Standard Test Methods for Water Vapor Transmission of Materials"; and are waterproof, passing the 4 hour water shower test as set forth in ASTM D 4869-05 entitled "Standard Specification for Asphalt-Saturated Organic Felt Underlayment Used in Steep Slope Roofing".

As an option, where the lightweight, pliable waterproof composite 40 is being used as a roofing product, an acrylic based roof coating (such as an acrylic-based roof coating that is currently used as a field coating over various roof substrates in the field) can be applied to the top major surface 46 of the pliable waterproof composite 40 to provide roof systems utilizing the pliable waterproof composite 40 with a more light-reflective surface. In one method, the acrylic-based roof coating could be applied to the top major surface 46 of the pliable waterproof composite 40 in a two-step process. First a white or gray acrylic coating could be applied, whereby a white acrylic coating is then applied over the white or gray acrylic coating. This type of acrylic based roof coating can be used to provide a pliable waterproof composite 40 with an Energy Star Rating.

Preferably, the water repellant coating materials applied to the reinforcement carrier membrane 20 and the acrylic based roof coating materials applied to the pliable waterproof composite 40 are factory applied using in-line or off-line processes so that the resulting products are prefabricated waterproof composites ready for use at a job site. These coating could be applied by various coating techniques, such as but not limited to slot die coating, etc. When using a slot die coating technique, the coating can be applied as a thin film coating on one side (on one major surface) with no or substantially no coating bleed through to the other side (other major surface) of the membrane or composite. It is contemplated that a preferred method for applying the coating materials would be with an "inking roll" that applies a very thin layer of the coating material. Preferably, the surface speed of the "inking roll" is less than the line speed of the product so that the relative speeds between the inking roll and the major surface of the product being coated causes the coating material forming the coating layer on the product to be back coated, ironed, and spread over the entire major surface of the product to form a coating with a relatively smooth surface that, for the low coating weights used, better bridges and closes interstices or voids in the fibrous mat 22 of the product to reduce the porosity of the fibrous mat 22. The pliable membranes 20 and composites 40 thus formed can be used for building construction applications, such as roofing applications, house wrap applications, and/or for other applications (such as but not limited to the formation of temporary non-slip surfaces).

FIG. 8 is a schematic side view of a production line 50 for forming the lightweight, pliable reinforcement carrier membrane 20. While the pliable, non-woven fibrous mat 22 may be formed from staple fibers in a conventional wet laid or air laid process, preferred embodiments of the reinforcement carrier membrane 20 have a non-woven fibrous mat 22 which is made solely of or made predominately of air laid generally continuous spunbond fibers (preferably generally continuous spunbond polyester fibers) and the method of the subject invention will be described with the non-woven fibrous mat 22 of the reinforcement carrier membrane 20 being made from generally continuous spunbond polyester fibers. The production line 50 includes: a mat forming station 52 for forming a pliable non-woven fibrous mat solely of generally continuous spunbond fibers, a fiber entangling station 54, a calendaring station 56, a binder application station 58, a dryer station 60, an accumulator station 62, and a windup station 64.

As shown, the mat forming station 52 includes a polymeric chip hopper 66, a fiber extruder 68, and a plurality of spinnerets 70 for forming a polymeric material into generally continuous, standard, spunbond polymeric fibers 24 of a desired denier. A typical denier range is between 2 and 3.5 denier. The generally continuous spunbond polymeric fibers 24 are laid in successive spunbond fiber drops 72 onto and across the width of a continuous conveyor lay belt 74 to form the lightweight, pliable non-woven fibrous mat 22 of generally continuous spunbond polymeric fibers 24 wherein the generally continuous spunbond polymeric fibers are preferably uniformly or substantially uniformly distributed throughout the mat. The non-woven fibrous mat 22 has a first major surface 28 and a second major surface 30, which are each defined by the length and width of the non-woven fibrous mat. As shown in FIG. 8, the first major surface 28 is the bottom major surface of the non-woven fibrous mat and the second major surface 30 is the top major surface of the non-woven fibrous mat. The first major surface 28 of the non-woven fibrous mat 22, as laid down, has portions 29 of a portion of the generally continuous spunbond polymeric fibers 24 of the non-woven fibrous mat protruding therefrom in extent and in sufficient amounts such that the protruding polymeric fiber portions give a first major surface of the non-woven fibrous mat 22 a fuzzy characteristic and the second major surface 30 of the non-woven fibrous mat 22, as laid down, has portions the generally continuous spunbond polymeric fibers of the non-woven fibrous mat protruding therefrom in extent and in sufficient amounts such that the protruding polymeric fiber portions give the second major surface of the non-woven fibrous mat a moderately fuzzy characteristic.

Where additional reinforcement 32 such as a scrim (preferably a fiberglass scrim) or generally continuous multifilament glass yarns are included within the non-woven fibrous mat 22, the reinforcement material forming the additional reinforcement 32 is preferably introduced into the non-woven fibrous mat by introducing the reinforcement 32 into the non-woven fibrous mat 22 between two of the spunbond fiber drops 72 (e.g. as shown in FIG. 8, between the second and third spunbond fiber drops) so that the additional reinforcement 32 is contained within the non-woven fibrous mat 22 rather than being located on one of the major surfaces of the non-woven fibrous mat. This location of the scrim, generally continuous multifilament glass yarns, or other reinforcement 32 within the non-woven fibrous mat 22 provides the non-woven fibrous mat with greater structural integrity and strength.

The generally continuous spunbond polymeric fibers 24 of the non-woven fibrous mat 22, with or without the additional reinforcement 32 contained within the non-woven fibrous mat, may be and preferably are further entangled to increase the overall structural integrity and strength of the non-woven fibrous mat 22. While other methods for further entangling the generally continuous spunbond polymeric fibers 24 of the non-woven fibrous mat 22 could be used, a preferred method for further entangling the generally continuous spunbond polymeric fibers 24 of the non-woven fibrous mat 22 is to subject the non-woven fibrous mat to a needle punching operation in the fiber entangling station 54. In the needle punching operation, a needle loom (needler) with the rows of barbed needles extending across the width of the non-woven fibrous mat 22 is used to further entangle the generally continuous spunbond polymeric fibers 24. In this operation, the rows of barbed needles are passed back and forth through the thickness of the non-woven fibrous mat 22 to engage and further entangle together the generally continuous spunbond polymeric fibers 24 of the non-woven fibrous mat.

In the calendaring station 56, the non-woven fibrous mat 22 is processed in a manner, such that: a) the portions 29 of a portion of the generally continuous spunbond polymeric fibers 24 projecting from the first major surface 28 of the non-woven fibrous mat continue to protrude somewhat from first major surface of the fibrous non-woven mat in extent and in sufficient amounts to give the first major surface of the non-woven fibrous mat a fuzzy characteristic to facilitate adhesion of a coating material to the first major surface of the non-woven fibrous mat; and b) the portions of a portion of the generally continuous spunbond polymeric fibers 24 projecting from the second major surface 30 of the non-woven fibrous mat are merged into the second major surface of the non-woven fibrous mat to give the second major surface of the non-woven fibrous mat a generally smooth, non-fuzzy surface. The method and apparatus shown for maintaining the first major surface 28 of the non-woven fibrous mat as a fuzzy surface and the second major surface 30 of the non-woven fibrous mat as a generally smooth non-fuzzy surface involves the passing of the non-woven fibrous mat between lower and upper calendar rolls 76 and 78 which exert heat and pressure on the first and second major surfaces of the non-woven fibrous mat 22. The calendar roll 76, which is in contact with the first major surface 28 of the non-woven fibrous mat 22, exerts heat and pressure on the first major surface of the non-woven fibrous mat that is insufficient to completely press the protruding polymeric fiber portions protruding from the first major surface of the non-woven fibrous mat into the mat whereby the first major surface 28 of the non-woven fibrous mat 22 retains its fuzzy characteristic. The calendar roll 78, which is in contact with the second major surface 30 of the non-woven fibrous mat 22, exerts heat and pressure on the second major surface of the non-woven fibrous mat that is sufficient to significantly press and merge the protruding polymeric fiber portions protruding from the second major surface of the non-woven fibrous mat into the second major surface of the mat whereby the second major surface of the non-woven fibrous mat is formed into a generally smooth, non-fuzzy surface.

In the binder application station 58 a hydrophobic binder 26, preferably a UV radiation resistant hydrophobic binder, is introduced into the non-woven fibrous mat 22 by saturating the non-woven fibrous mat with the hydrophobic binder. To ensure that the hydrophobic binder is dispersed throughout the non-woven fibrous mat 22, the non-woven fibrous mat 22 is preferably saturated with the hydrophobic binder to an extent that the non-woven fibrous mat contains the hydrophobic binder in an amount in excess of that required thereby dispersing the hydrophobic binder throughout the non-woven fibrous mat. The excess hydrophobic binder 26 is then removed from the non-woven fibrous mat 22 in a manner such that the first major surface 28 of the non-woven fibrous mat retains the protruding polymeric fiber portions that give the first major surface of the non-woven fibrous mat the fuzzy characteristic to facilitate adhesion of a coating material to the first major surface of the fibrous mat and the second major surface 30 of the non-woven fibrous mat retains a generally smooth, non-fuzzy surface. This can be accomplished through a dip-saturation, squeeze/nip binder application process, or other similar processing means.

In a preferred embodiment of the method of the subject invention, the hydrophobic binder 26 is introduced into the non-woven fibrous mat 22 by a dip saturation technique wherein the mat is submerged in and passed through a bath 80 of the hydrophobic binder. The excess hydrophobic binder in the non-woven fibrous mat 22 is then removed from the non-woven fibrous mat by passing the non-woven fibrous mat between first and second squeeze rolls 82 and 84. The squeeze rolls 82 and 84 exert sufficient pressure on the non-woven fibrous mat 22 to remove the excess hydrophobic binder from the non-woven fibrous mat. However, the first squeeze roll 82 in contact with the first major surface 28 of the non-woven fibrous mat exerts pressure on the first major surface of the non-woven fibrous mat that is insufficient to press the protruding polymeric fiber portions protruding from the first major surface of the non-woven fibrous mat into the mat whereby the first major surface of the fibrous mat retains the fuzzy characteristic and the second squeeze roll 84 in contact with the second major surface 30 of the non-woven fibrous mat exerts pressure on the second major surface of the non-woven fibrous mat that enables the second major surface of the non-woven fibrous mat to retain its smooth, non-fuzzy surface. Where the hydrophobic binder 26 utilized remains somewhat tacky after the binder has been cured in the dryer station 60, the excess binder can be removed from the non-woven fibrous mat as the non-woven fibrous mat passes between the squeeze rolls 82 and 84 so that the hydrophobic binder 26 is present on the second major surface 30 of the non-woven fibrous mat in an amount sufficient to give the second major surface of the non-woven fibrous mat a tackiness to increase surface friction of the second major surface of the non-woven fibrous mat e.g. in order to make the second major surface of the non-woven fibrous mat slip resistant.

In the dryer 60, accumulator 62 and windup 64 stations, the hydrophobic binder 26 contained in the non-woven fibrous mat 22 is cured to complete the formation of the pliable reinforcement carrier membrane 20 and the pliable reinforcement carrier membrane 20 is wound into rolls 86 for further processing or other utilization. Where required to prevent successive roll layers of the pliable reinforcement carrier membrane 20 from sticking together in the rolls 86 of reinforcement carrier membrane formed by the process, a release sheet, with a suitable release agent, can be introduced between the successive membrane layers of the rolls as the rolls are being formed.

FIG. 9 is a schematic side view of a production line 90 for coating the lightweight, pliable reinforcement carrier membrane 20 to make a lightweight, pliable waterproof composite 40 such as a roofing underlayment, a house wrap, a facing for an insulation blanket or board, etc. As shown, the production line 90 includes: a reinforcement carrier membrane supply station 92; a first accumulator station 94; a coating station 96; a liquid parting agent application station 98; a final cooling station 100; a second accumulator station 102; and a windup station 104.

In the reinforcement carrier membrane supply station 92, the lightweight, pliable reinforcement carrier membrane 20 is unwound from a roll 86 so that the reinforcement carrier membrane passes 20 through the production line 90 with the first major surface 28 of the reinforcement carrier membrane as the bottom surface and the second major surface 30 of the reinforcement carrier membrane as the top surface. The reinforcement carrier membrane 20 passes through the first accumulator station 94 and into the coating station 96. In the coating station 96 a filled asphalt, modified bitumen, or non-asphaltic polymeric coating material is applied to the first major surface 28 of the reinforcement carrier membrane 20. As applied, the coating 42 formed by the filled asphalt, modified bitumen, or non-asphaltic polymeric coating material overlies, is coextensive or substantially coextensive with, and adhered to the first major surface 28 of the reinforcement carrier membrane 20 to provide a barrier against liquid water transmission and form the bottom major surface 44 of the pliable waterproof composite 40.

In a preferred embodiment of the method of the subject invention, the filled asphalt, modified bitumen, or non-asphaltic polymeric coating material is applied to the first major surface 28 of the reinforcement carrier membrane 20 by means of a coating roll/vat application process. In this application process, the first major surface 28 of the reinforcement carrier membrane 20 is on the underside of the membrane and the thin coating layer of the filled asphalt, modified bitumen, or non-asphaltic polymeric coating material (e.g. a coating layer between about 0.20 mm and about 0.50 mm in thickness) is applied to the first major surface 28 of the reinforcement carrier membrane 20 by a roll 106. The roll 106 rotates with a bottom portion of the roll passing through a vat 108 of the coating material to pick up coating material on the roll and a top portion of the roll in contact with the underside of the reinforcement carrier membrane 20 to apply the coating material picked up by the roll in the vat to the underside of the reinforcement carrier membrane 20. Preferably, the surface speed of the roll 106 is less than the line speed of the product so that the relative speeds between the roll 106 and the major surface 28 of the reinforcement carrier membrane 20 causes the coating material forming the coating 42 on major surface 28 of the reinforcement carrier membrane 20 to be back coated, ironed, and spread over the entire major surface of the reinforcement carrier membrane to form a coating 42 with a relatively smooth surface that, for the low coating weights used, better bridges and closes interstices or voids in the non-woven fibrous mat 22 of the reinforcement carrier membrane to reduce the porosity of the non-woven fibrous mat 22. Since, in this application process, the roll 106 is coating the fuzzy first major surface 28 of the reinforcement carrier membrane 20, a very strong bond in formed between the coating 42 and the reinforcement carrier membrane 20 to form the pliable waterproof composite 40.

The pliable waterproof composite 40 is then passed between and over spaced apart rollers to commence the cooling of the coating 42. A liquid parting agent ("LPA") such as but not limited to AquaMate™ Anti-Tak 40 is spray applied or otherwise applied to the bottom major surface 44 and potentially the top major surface 46 of the pliable waterproof composite 40 in the liquid parting agent application station 98 e.g. by spraying apparatus 110. The use of an LPA rather than sand as a processing agent for preventing hot coating materials from sticking to stainless steel rolls of the process line and from sticking to itself as it is unrolled has significant benefits. The elimination of the use of sand as a processing agent has: a) enabled a reduction in the final weight of the pliable waterproof composite of more than 30%; b) enabled the formation of the pliable waterproof composite with the top and bottom major surfaces described above; c) enabled a significant increase in plant safety and cleanliness in this coating process; and d) enabled a cost reduction due to the use of a relatively weak dilution of an LPA/water concentrate as the processing agent rather than sand or other gritty materials.

After passing through the liquid parting agent application station 98, the pliable waterproof composite 40 is passed through the final cooling station 100 to finish the cooling of the asphaltic, modified bituminous, or polymeric coating 42 and complete the formation of the pliable waterproof composite 40. The pliable waterproof composite 40 is then passed through the second accumulator station 102 and wound into a roll 112 in the windup station 104 for storage, shipment, further processing, and/or application at a job site. Where required to prevent successive roll layers of the pliable waterproof composite 40 from sticking together in the rolls 112 of composite formed by the process, e.g. when the coating 42 is a self-adhering asphaltic coating, a release sheet, with a suitable release agent, can be introduced between the successive composite layers of the rolls 112 as the rolls are being formed or elsewhere in the process.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. For example, the lightweight pliable reinforcement carrier membrane 20 and the lightweight, pliable waterproof composite 40 could be made in a continuous manufacturing operation on a single production line rather than two separate production lines. Thus, the invention is not intended to be limited to the specific embodiments disclosed, but is to be limited only by the claims appended hereto.

What is claimed is:

1. A pliable reinforcement carrier membrane for use in a coated membrane composite, comprising:
    a pliable non-woven fibrous mat; the fibrous mat comprising entangled polymeric fibers and a hydrophobic binder that bonds the polymeric fibers together; the fibrous mat having a length, a width, and a thickness; the fibrous mat having a first major surface and a second major surface that are each defined by the length and the width of the fibrous mat; the first major surface of the fibrous mat having portions of a portion of the polymeric fibers of the non-woven fibrous mat protruding therefrom in extent and in sufficient amounts to give the first major surface of the non-woven fibrous mat a fuzzy characteristic to facilitate adhesion of a coating material to the first major surface of the fibrous mat; and the second major surface of the fibrous mat being a generally smooth, non-fuzzy surface; and wherein the hydrophobic binder is present on the second major surface of the fibrous mat; and the hydrophobic binder on the second major surface of the fibrous mat retains an innate tackiness and is present in an amount sufficient to increase surface friction of the second major surface of the fibrous mat.

2. The pliable reinforcement carrier membrane according to claim 1, wherein:
    the polymeric fibers of the fibrous mat have been further entangled after the fibrous mat was initially formed to provide the fibrous mat with a greater resistance to delamination.

3. The pliable reinforcement carrier membrane according to claim 1, wherein:
    the fibrous mat contains a reinforcement.

4. The pliable reinforcement carrier membrane according to claim 1, wherein:

the polymeric fibers are substantially uniformly dispersed throughout the fibrous mat.

5. The pliable reinforcement carrier membrane according to claim 1, wherein:
the polymeric fibers comprise generally continuous spunbond polymeric fibers.

6. The pliable reinforcement carrier membrane according to claim 5, wherein:
the fibrous mat consists essentially of the generally continuous spunbond polymeric fibers and the hydrophobic binder.

7. The pliable reinforcement carrier membrane according to claim 6, wherein:
the generally continuous spunbond polymeric fibers are generally continuous spunbond polyester fibers.

8. The pliable reinforcement carrier membrane according to claim 1, wherein:
the polymeric fibers are discontinuous filaments or staple fibers.

9. The pliable reinforcement carrier membrane according to claim 1, wherein:
the hydrophobic binder at least partially closes interstices of the fibrous mat to thereby increase liquid water transmission resistance of the fibrous mat.

10. The pliable reinforcement carrier membrane according to claim 1, wherein:
the fibrous mat is between 59% and 90% by weight the polymeric material of the polymeric fibers and between 10% and 41% by weight the hydrophobic binder.

11. The pliable reinforcement carrier membrane according to claim 1, wherein:
the hydrophobic binder is significantly resistant to UV radiation degradation; and the hydrophobic binder at least partially closes interstices of the fibrous mat to thereby increase liquid water transmission resistance of the fibrous mat;
the polymeric fibers are substantially uniformly dispersed throughout the fibrous mat; the polymeric fibers comprise generally continuous spunbond polymeric fibers; the polymeric fibers of the fibrous mat have been further entangled after the fibrous mat was initially formed to provide the fibrous mat with a greater resistance to delamination.

12. The pliable reinforcement carrier membrane according to claim 11, wherein:
the fibrous mat contains a reinforcement.

13. The pliable reinforcement carrier membrane according to claim 11, wherein:
the fibrous mat consists essentially of the generally continuous spunbond polymeric fibers and the hydrophobic binder.

14. The pliable reinforcement carrier membrane according to claim 13, wherein:
the generally continuous spunbond polymeric fibers are generally continuous spunbond polyester fibers.

15. The pliable reinforcement carrier membrane according to claim 14, wherein:
the fibrous mat is between 59% and 90% by weight the polymeric material of the polymeric fibers and between 10% and 41% by weight the hydrophobic binder.

16. A method of making a pliable reinforcement carrier membrane for use in a coated membrane composite, comprising:
forming and processing a flexible, non-woven, fibrous mat comprising entangled polymeric fibers in a manner such that a first major surface of the fibrous mat has portions of a portion of the polymeric fibers of the non-woven fibrous mat protruding therefrom in extent and in sufficient amounts that the protruding polymeric fiber portions give the first major surface of the non-woven fibrous mat a fuzzy characteristic to facilitate adhesion of a coating material to the first major surface of the fibrous mat and a second major surface of the fibrous mat has a generally smooth, non-fuzzy surface; the fibrous mat having a length, a width, and a thickness; the first major surface and the second major surface of the fibrous mat each being defined by the length and the width of the fibrous mat;
introducing a hydrophobic binder into the fibrous mat for bonding together the polymeric fibers of the fibrous mat;
curing the binder of the fibrous mat to bond together the polymeric fibers of the fibrous mat; and
curing the hydrophobic binder such that the hydrophobic binder remains somewhat tacky and is present on the second major surface of the fibrous mat in an amount sufficient to give the second major surface of the fibrous mat a tackiness to increase surface friction of the second major surface of the fibrous mat.

17. The method of making a pliable reinforcement carrier membrane for use in a coated membrane composite, according to claim 16 wherein:
the fibrous mat, as laid down, has the portion of the polymeric fibers of the non-woven fibrous mat protruding therefrom in extent and in sufficient amounts that the protruding polymeric fiber portions give the first major surface of the non-woven fibrous mat the fuzzy characteristic; and second major surface has a portion of the polymeric fibers of the non-woven fibrous mat protruding therefrom in extent and in sufficient amounts that the protruding polymeric fiber portions give the second major surface of the non-woven fibrous mat a fuzzy characteristic; and
the processing of the fibrous mat in a manner, such that the first major surface of the fibrous mat has the portion of the polymeric fibers of the non-woven fibrous mat protruding therefrom in extent and in sufficient amounts that the protruding polymeric fiber portions give the first major surface of the non-woven fibrous mat a fuzzy characteristic to facilitate adhesion of a coating material to the first major surface of the fibrous mat and the second major surface of the fibrous mat has the generally smooth non-fuzzy surface, comprises passing the fibrous mat between first and second calendar rolls wherein the first calendar roll is in contact with the first major surface of the fibrous mat and exerts heat and pressure on the first major surface of the fibrous mat that is insufficient to fully press the protruding polymeric fiber portions protruding from the first major surface of the mat into the mat whereby the first major surface of the fibrous mat retains the fuzzy characteristic and the second calendar roll is in contact with the second major surface of the fibrous mat and exerts heat and pressure on the second major surface of the fibrous mat that is sufficient to press the protruding polymeric fiber portions protruding from the second major surface of the fibrous mat into the second major surface of the mat and form the generally smooth, non-fuzzy surface.

18. The method of making a pliable reinforcement carrier membrane for use in a coated membrane composite, according to claim 17 wherein:
the polymeric fibers are substantially uniformly distributed throughout the fibrous mat; and the fibrous mat is needled to further entangle the polymeric fibers of the fibrous mat after the fibrous mat has been initially formed to provide the fibrous mat with a greater resistance to delamination.

19. The method of making a pliable reinforcement carrier membrane for use in a coated membrane composite, according to claim 18 wherein:
the fibrous mat is passed between the first and second calendar rolls subsequent to being needled and prior to the introduction of the hydrophobic binder into the fibrous mat.

20. The method of making a pliable reinforcement carrier membrane for use in a coated membrane composite, according to claim 19 wherein:
the hydrophobic binder is introduced into the fibrous mat by saturating the fibrous mat with the hydrophobic binder; the fibrous mat is saturated with the hydrophobic binder to an extent that the fibrous mat contains an excess of the hydrophobic binder; and the excess hydrophobic binder is removed from the fibrous mat in a manner such that the first major surface of the fibrous mat retains the protruding polymeric fiber portions that give the first major surface of the fibrous mat the fuzzy characteristic to facilitate adhesion of a coating material to the first major surface of the fibrous mat and the second major surface of the fibrous mat retains a generally smooth, non-fuzzy surface.

21. The method of making a pliable reinforcement carrier membrane for use in a coated membrane composite, according to claim 20 wherein:
the hydrophobic binder is introduced into the fibrous mat by dip saturation and the excess hydrophobic binder is removed from the fibrous mat by passing the fibrous mat between first and second squeeze rolls wherein the squeeze roll in contact with the first major surface of the fibrous mat exerts pressure on the first major surface of the fibrous mat that is insufficient to fully press the protruding polymeric fiber portions protruding from the first major surface of the mat into the mat whereby the first major surface of the fibrous mat retains the fuzzy characteristic.

22. A pliable waterproof composite, comprising:
a pliable non-woven fibrous mat; the fibrous mat comprising entangled polymeric fibers and a hydrophobic binder that bonds the polymeric fibers together; the fibrous mat having a length, a width, and a thickness; the fibrous mat having a first major surface and a second major surface that are each defined by the length and the width of the fibrous mat; the first major surface of the fibrous mat having portions of a portion of the polymeric fibers of the non-woven fibrous mat protruding therefrom in extent and in sufficient amounts to give the first major surface of the non-woven fibrous mat a fuzzy characteristic to facilitate adhesion of a coating material to the first major surface of the fibrous mat; and the second major surface of the fibrous mat being a generally smooth, non-fuzzy surface; wherein the hydrophobic binder is present on the second major surface of the fibrous mat; and the hydrophobic binder on the second major surface of the fibrous mat retains an innate tackiness and is present in an amount sufficient to increase surface friction of the second major surface of the fibrous mat; and
a filled asphalt, modified bitumen, or non-asphaltic polymeric coating overlying, substantially coextensive with, and adhered to the first major surface of the fibrous mat to provide a barrier against liquid water transmission through and form a bottom major surface of the pliable waterproof composite.

23. The pliable waterproof composite according to claim 22, wherein:
the second major surface of the fibrous mat forms a top major surface of the pliable waterproof composite.

24. The pliable waterproof composite according to claim 22, wherein:
the polymeric fibers of the fibrous mat have been further entangled after the fibrous mat was initially formed to provide the fibrous mat with a greater resistance to delamination.

25. The pliable waterproof composite according to claim 22, wherein:
the fibrous mat contains a reinforcement.

26. The pliable waterproof composite according to claim 22, wherein:
the polymeric fibers are substantially uniformly dispersed throughout the fibrous mat.

27. The pliable waterproof composite according to claim 22, wherein:
the polymeric fibers comprise generally continuous spunbond polymeric fibers.

28. The pliable waterproof composite according to claim 27, wherein:
the fibrous mat consists essentially of the generally continuous spunbond polymeric fibers and the hydrophobic binder.

29. The pliable waterproof composite according to claim 28, wherein:
the generally continuous spunbond polymeric fibers are generally continuous spunbond polyester fibers.

30. The pliable waterproof composite according to claim 22, wherein:
the polymeric fibers are discontinuous filaments or staple fibers.

31. The pliable waterproof composite according to claim 22, wherein:
the hydrophobic binder at least partially closes interstices of the fibrous mat to thereby increase liquid water transmission resistance of the fibrous mat.

32. The pliable waterproof composite according to claim 22, wherein:
the fibrous mat is between 59% and 90% by weight the polymeric material of the polymeric fibers and between 10% and 41% by weight the hydrophobic binder.

33. The pliable waterproof composite according to claim 22, wherein:
the bottom major surface of the pliable waterproof composite is coated with a liquid parting agent and the pliable waterproof composite is wound into a roll for ease of storage, shipment, handling, and installation.

34. The pliable waterproof composite according to claim 22, wherein:
the fibrous mat averages between about 0.25 mm and about 0.40 mm in thickness and the coating averages between about 0.20 mm and about 0.50 mm in thickness.

35. The pliable waterproof composite according to claim 22, wherein:
the hydrophobic binder at least partially closes interstices of the fibrous mat to thereby increase liquid water transmission resistance of the fibrous mat;
the polymeric fibers are substantially uniformly dispersed throughout the fibrous mat; the polymeric fibers comprise generally continuous spunbond polymeric fibers; the polymeric fibers of the fibrous mat have been further entangled after the fibrous mat was initially formed to provide the fibrous mat with a greater resistance to delamination.

36. The pliable waterproof composite according to claim 35, wherein:
the fibrous mat contains a reinforcement.

37. The pliable waterproof composite according to claim 35, wherein:
the fibrous mat consists essentially of the generally continuous spunbond polymeric fibers and the hydrophobic binder.

38. The pliable waterproof composite according to claim 37, wherein:
the generally continuous spunbond polymeric fibers are generally continuous spunbond polyester fibers.

39. The pliable waterproof composite according to claim 38, wherein:
the fibrous mat is between 59% and 90% by weight the polymeric material of the polymeric fibers and between 10% and 41% by weight the hydrophobic binder.

40. The pliable waterproof composite according to claim 35, wherein:
the bottom major surface of the pliable waterproof composite is coated with a liquid parting agent and the pliable waterproof composite is wound into a roll for ease of storage, shipment, handling, and installation.

41. The pliable waterproof composite according to claim 35, wherein:
the fibrous mat averages between about 0.25 mm and about 0.40 mm in thickness and the coating averages between about 0.20 mm and about 0.50 mm in thickness.

42. The pliable waterproof composite according to claim 35, wherein:
the hydrophobic binder is resistant to UV radiation degradation; and
the pliable waterproof composite is a roofing underlayment.

43. A method of making a pliable waterproof composite, comprising:
providing a pliable non-woven fibrous mat; the fibrous mat comprising entangled polymeric fibers and a hydrophobic binder that bonds the polymeric fibers together; the fibrous mat having a length, a width, and a thickness; the fibrous mat having a first major surface and a second major surface that are each defined by the length and the width of the fibrous mat; the first major surface of the fibrous mat having portions of a portion of the polymeric fibers of the non-woven fibrous mat protruding therefrom in extent and in sufficient amounts to give the first major surface of the non-woven fibrous mat a fuzzy characteristic to facilitate adhesion of a coating material to the first major surface of the fibrous mat; and the second major surface of the fibrous mat being a generally smooth, non-fuzzy surface; and
coating the first major surface of the fibrous mat with a filled asphalt, modified bitumen, or non-asphaltic polymeric coating that overlies, is substantially coextensive with, and adhered to the first major surface of the fibrous mat to provide a barrier against liquid water transmission and form a bottom major surface of the pliable waterproof composite;
wherein the hydrophobic binder is present on the second major surface of the fibrous mat; and the hydrophobic binder on the second major surface of the fibrous mat retains an innate tackiness and is present in an amount sufficient to increase surface friction of the second major surface of the fibrous mat.

44. The method of making a pliable waterproof composite according to claim 43, including:
treating the bottom major surface of the pliable waterproof composite with a liquid parting agent.

45. The method of making a pliable waterproof composite according to claim 44, including:
forming a top major surface of the pliable waterproof composite with the second major surface of the fibrous mat.

46. The method of making pliable waterproof composite according to claim 43, wherein:
the polymeric fibers of the fibrous mat have been further entangled after the fibrous mat was initially formed to provide the fibrous mat with a greater resistance to delamination.

47. The method of making pliable waterproof composite according to claim 43, wherein:
the fibrous mat contains a reinforcement.

48. The method of making pliable waterproof composite according to claim 43, wherein:
the polymeric fibers are substantially uniformly dispersed throughout the fibrous mat; and
the fibrous mat consists essentially of generally continuous spunbond polyester fibers and the hydrophobic binder.

49. The method of making pliable waterproof composite according to claim 43, wherein:
the fibrous mat is between 59% and 90% by weight the polymeric material of the polymeric fibers and between 10% and 41% by weight the hydrophobic binder; and
the hydrophobic binder at least partially closes interstices of the fibrous mat to thereby increase liquid water transmission resistance of the fibrous mat.

50. The method of making a pliable waterproof composite according to claim 43, wherein:
the fibrous mat averages between about 0.25 mm and about 0.40 mm in thickness and the coating averages between about 0.20 mm and about 0.50 mm in thickness.

51. A method of making a pliable waterproof roofing composite, comprising:
forming a reinforcement carrier membrane by forming and processing a flexible, non-woven, fibrous mat comprising entangled polymeric fibers in a manner such that a first major surface of the fibrous mat has portions of a portion of the polymeric fibers of the non-woven fibrous mat protruding therefrom in extent and in sufficient amounts to give the first major surface of the non-woven fibrous mat a fuzzy characteristic to facilitate adhesion of a coating material to the first major surface of the fibrous mat and a second major surface of the fibrous mat has a generally smooth, non-fuzzy surface; the fibrous mat having a length, a width, and a thickness; the first major surface and the second major surface of the fibrous mat each being defined by the length and the width of the fibrous mat; introducing a hydrophobic binder into the fibrous mat for bonding together the polymeric fibers of the fibrous mat; and curing the binder of the fibrous mat to bond the polymeric fibers of the fibrous mat together; and
coating the first major surface of the fibrous mat with a filled asphalt, modified bitumen, or non-asphaltic polymeric coating that overlies, is substantially coextensive with, and adhered to the first major surface of the fibrous mat to provide a barrier against liquid water transmission and form a bottom major surface of the pliable waterproof roofing composite;
wherein the hydrophobic binder is present on the second major surface of the fibrous mat; and the hydrophobic binder on the second major surface of the fibrous mat retains an innate tackiness and is present in an amount sufficient to increase surface friction of the second major surface of the fibrous mat.

52. The method of making a pliable waterproof roofing composite according to claim 51, including:
   treating the bottom major surface of the pliable waterproof roofing composite with a liquid parting agent and winding the pliable waterproof roofing composite into a roll for ease of storage, shipment, handling, and installation.

53. The method of making a pliable waterproof roofing composite according to claim 51, wherein:
   the second major surface of the fibrous mat forms a top major surface of the pliable waterproof roofing composite.

54. The method of making pliable waterproof roofing composite according to claim 53, wherein:
   the hydrophobic binder is somewhat resistant to UV radiation degradation.

\* \* \* \* \*